(12) United States Patent
Phillips

(10) Patent No.: US 8,637,804 B2
(45) Date of Patent: Jan. 28, 2014

(54) ROTARY POSITION ENCODER

(75) Inventor: Nathan J. Phillips, E. Amherst, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 443 days.

(21) Appl. No.: 12/705,829

(22) Filed: Feb. 15, 2010

(65) Prior Publication Data
US 2011/0139971 A1    Jun. 16, 2011

Related U.S. Application Data

(60) Provisional application No. 61/285,472, filed on Dec. 10, 2009.

(51) Int. Cl.
*G01D 5/34* (2006.01)
*G11B 7/00* (2006.01)

(52) U.S. Cl.
USPC ............ 250/231.18; 250/231.14; 250/231.16; 369/44.26

(58) Field of Classification Search
USPC ............... 250/205, 231.13–231.18, 233, 236, 250/234, 235, 237 G, 237 R, 239, 578.1, 250/486.1, 487.1, 488.1; 369/44.26, 44.27, 369/44.29, 54, 58, 103, 43, 44.11, 44.12, 369/44.21, 44.22, 44.24, 44.37, 44.38, 369/44.39, 44.41, 112.01, 112.08, 112.24; 341/3, 11, 13, 31; 356/614–617
See application file for complete search history.

(56) References Cited

U.S. PATENT DOCUMENTS

| | | | |
|---|---|---|---|
| 3,731,107 A * | 5/1973 | Goodwin et al. | 250/227.31 |
| 4,908,510 A * | 3/1990 | Huggins et al. | 250/231.13 |
| 5,241,172 A * | 8/1993 | Lugaresi | 250/231.16 |
| 5,640,377 A * | 6/1997 | Watanabe et al. | 369/53.3 |
| 5,875,158 A | 2/1999 | Schell | |
| 6,087,655 A | 7/2000 | Kobrin | |
| 6,424,605 B1 * | 7/2002 | Iida | 369/44.27 |
| 7,414,547 B2 | 8/2008 | Wang et al. | |
| 7,944,794 B2 * | 5/2011 | Fujita et al. | 369/103 |

* cited by examiner

*Primary Examiner* — Kevin Pyo
*Assistant Examiner* — Don Williams
(74) *Attorney, Agent, or Firm* — Howard IP Law Group, PC

(57) ABSTRACT

A rotary position encoder for determining a rotary position of a shaft includes a rigid substrate having a planar surface and mounted on the shaft to rotate with the shaft; an optical disk having at least a transparent polycarbonate layer and a reflective layer on the transparent polycarbonate layer, affixed to the planar surface of the substrate, the optical disk having a first circumferential track encoded therein having binary data; an optics assembly for interrogating the optical disk and providing an output signal indicative of data received from the interrogation of the optical disk; and a tracking motor for driving the optics assembly radially with respect to the optical disk.

22 Claims, 7 Drawing Sheets

ROTARY POSITION ENCODER

CROSS-REFERENCE TO RELATED APPLICATIONS

This application claims priority to Provisional Patent Application Ser. No. 61/285,472 entitled ROTARY POSITION ENCODER filed Dec. 10, 2009, the subject matter thereof incorporated by reference in its entirety.

FIELD

The present invention relates to rotary position encoders.

BACKGROUND

Rotary position encoders are employed to determine the position and/or speed of rotating elements, such as shafts attached to machinery.

Systems currently in use employ custom precision etched glass disks that are fixed to a rotating member, such as a rotating shaft. A system of optical emitters and optical sensors may be provided to detect changes in rotary position. Other systems employ etched metal bands. Interferometric techniques are employed to obtain high resolution rotary position data.

SUMMARY OF THE INVENTION

In one embodiment of the invention, a rotary position encoder for determining a rotary position of a shaft includes a rigid substrate having a planar surface and mounted on the shaft to rotate with the shaft; an optical disk having at least a transparent polycarbonate layer and a reflective layer on the transparent polycarbonate layer, affixed to the planar surface of the substrate, the optical disk having a first circumferential track encoded therein having binary data; an optics assembly for interrogating the optical disk and providing an output signal indicative of data received from the interrogation of the optical disk; and tracking motors for driving the optics assembly radially with respect to the optical disk, and for focusing the optics correctly on the optical disk.

In an embodiment, a method of determining a rotary position of a shaft includes driving an optics assembly radially with respect to an optical disk affixed to a rigid substrate affixed to the shaft; actively focusing the optics assembly; emitting light by the optics assembly to transit a transparent polycarbonate layer of the optical disk and to be reflected from at least one encoded track defined in a reflective layer of the optical disk; receiving light reflected from the at least one encoded track; outputting a signal indicative of the received light; determining data indicative of the rotary position of the shaft based on the signal; and outputting the rotary position data.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts and in which.

DETAILED DESCRIPTION

It is to be understood that the figures and descriptions of the present invention have been simplified to illustrate elements that are relevant for a clear understanding of the present invention, while eliminating, for the purpose of clarity, many other elements found in rotary position encoders. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

A challenge in the field of high precision rotary position encoders is cost. Devices employing etched glass disks are expensive to produce.

Figure 1:
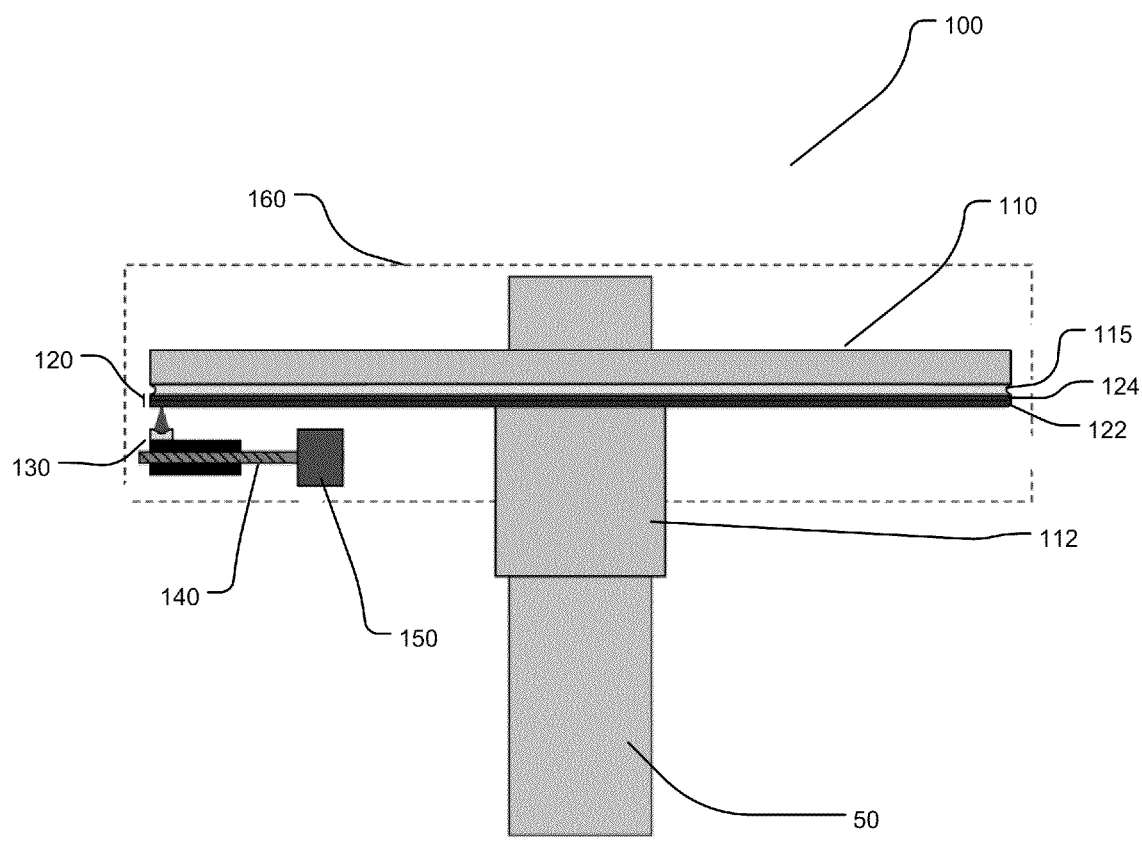
FIG. 1 is a schematic view of a rotary position encoder coupled to a shaft.

Referring to FIG. 1, a rotary position encoder 100 for determining a rotary position, or angular position, of a shaft 50 is shown in a schematic view. Shaft 50 may be coupled to a shaft of a rotating machine, for example. Rotary position encoder 100 has a rigid substrate 110 mounted to rotate with shaft 50. Position encoder 100 may be mounted to an end of shaft 50, or position encoder 100 may be coupled to a central portion of shaft 50. Shaft 50 may be solid or hollow. A hollow shaft 50 may be used to pass wires, optical signals, or mechanical linkages. Rigid substrate 110 may be, for example, a disk of rigid material, such as a metal, such as steel or aluminum. Substrate 110 may be directly rigidly coupled to shaft 50 or may be rigidly coupled to shaft 50 through an intermediary structure. In an embodiment, substrate 110 is rigidly coupled to sleeve 112, which in turn is rigidly coupled to an outer surface of shaft 50.

Rigid substrate 110 has on a planar surface an optical disk 120. Optical disk 120 is rigidly affixed to the planar surface of rigid substrate 110, such as by an adhesive 115. Both rigid substrate 110 and adhesive 115 may be materials that expand and contract at a similar rates to optical disk 120 according to changes in temperature. Optical disk 120 has at least a transparent polycarbonate layer 122 and a reflective layer 124 on the transparent polycarbonate layer. Transparent layer 122 is opposite rigid substrate 110. Optical disk 120 may be a digital video disk (DVD) for example. Optical disk 120 may be a disk that is compliant with any suitable format for optical disks, such as the Blu-Ray format.

Optics assembly 130 is provided for interrogating the optical disk 120 and providing an output signal indicative of data received from the interrogation of the optical disk. Optics assembly 130 includes at least one optical emitter that is suitably mounted and configured to emit radiation to the optical disk 120, and at least one optical sensor mounted and configured to receive radiation reflected from optical disk 120 and to output a signal indicative of the received radiation. Optical emitters may be lasers or other sources of collimated light. Optics assembly 130 is mounted on arm 140 which is mounted so as to be driven by servo motor 150 radially relative to the optical disk 120. Arm 140 and servo motor 150 may be substantially the same as arms on conventional optics assemblies, such as on a DVD reading assembly. Alternatively, because only the outer portion of disk 120 will be read (discussed further in reference to FIGS. 3 and 5 below), arm 140 and servo motor 150 may be designed so that optics assembly 130 radially spans only the outermost circumferential area of disk 120.

A housing 160 may substantially surround encoder 100. Housing 160 may allow shaft 50 to pass through for installation purposes of encoder 100 while encapsulating the remaining components of encoder 100. Alternatively, housing 160 may completely surround encoder 100 while providing a mounting point for shaft 50 to mount to encoder 100 through structure provided as part of housing 160. Housing 160 may additionally include any processing hardware or circuitry as may be needed and may provide a serial output to output rotary position and absolute position data.

Figure 2:
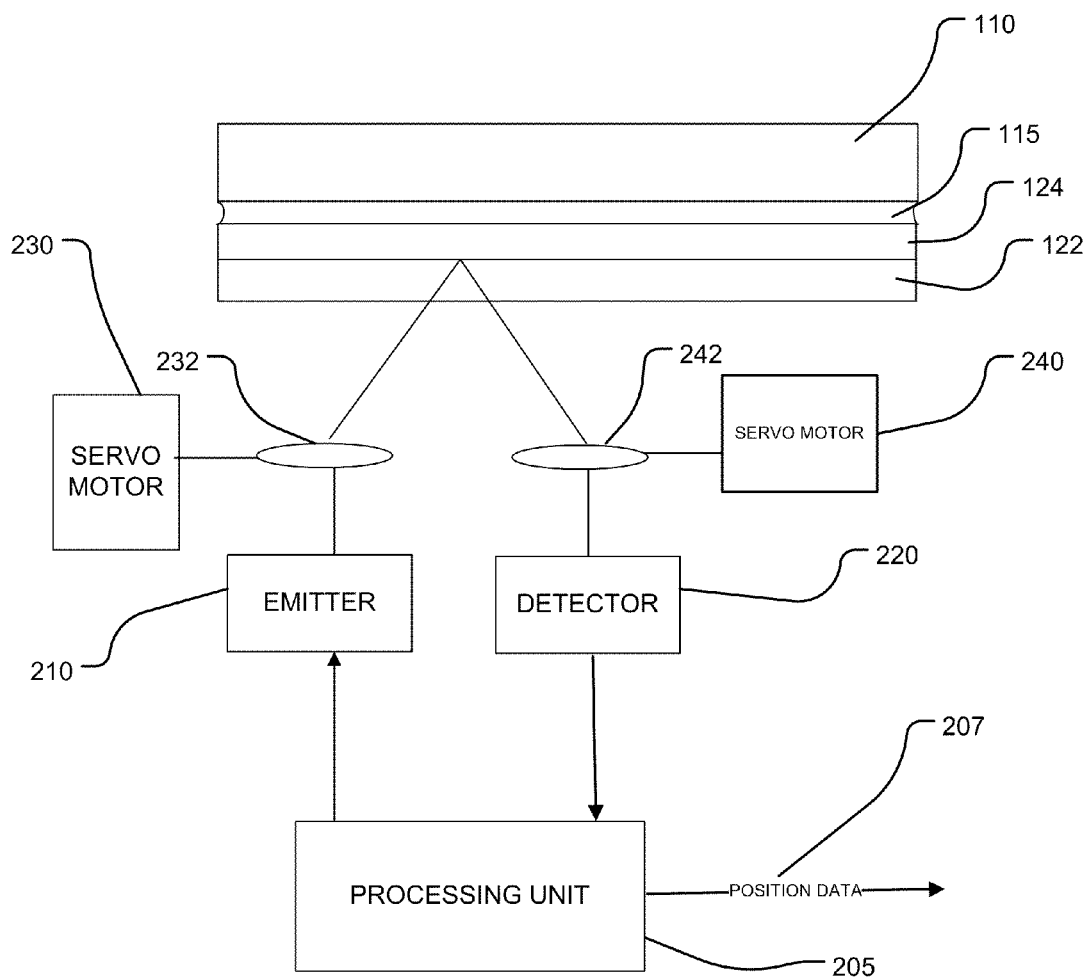
FIG. 2 is a schematic view showing additional elements of a rotary position encoder.

Referring now to FIG. 2, a schematic view of encoder 100 is shown. Processing unit 205 may be a device including one or more suitably programmed microprocessors with a communications bus interfacing with numerous inputs and outputs. Processing unit 205 provides a control signal to optical emitter 210. In response to a control signal, optical emitter 210 emits a periodic or continuous optical beam that is focused by lens assembly 232. Lens assembly 232 may be made up of one or more lenses. The positions of lenses of lens assembly 232 relative to optical emitter 210 may be adjusted by servo motor 230. The focused beam from lens assembly 232 transits transparent polycarbonate layer 122 of optical disk 120 and is reflected by reflective layer 124 back through polycarbonate layer 122 and to lens assembly 242. Lens assembly 242, the position of which may be adjusted by servo motor 240, focuses the reflected beam onto photodetector 220. Photodetector 220 outputs a signal having data indicative of the detected reflected beam to processing unit 205. Processing unit 205 is programmed to interpret the data from photodetector 220 to determine a position and provide a position data output signal at 207.

An alternative embodiment of encoder 100 may incorporate a single lens and servo motor 230. Such an embodiment would have a beam splitter configured to allow the light from the emitter 210 to pass through the single lens in one direction while reflected light would return through the same single lens and be refracted or reflected into the detector 220. Detector 220 may incorporate multiple sensing elements in order to facilitate tracking and/or focusing. Multiple elements may also be used to simultaneously read two adjacent tracks on optical disk 120 or to sense the direction that the previous bit has moved.

Figure 3:
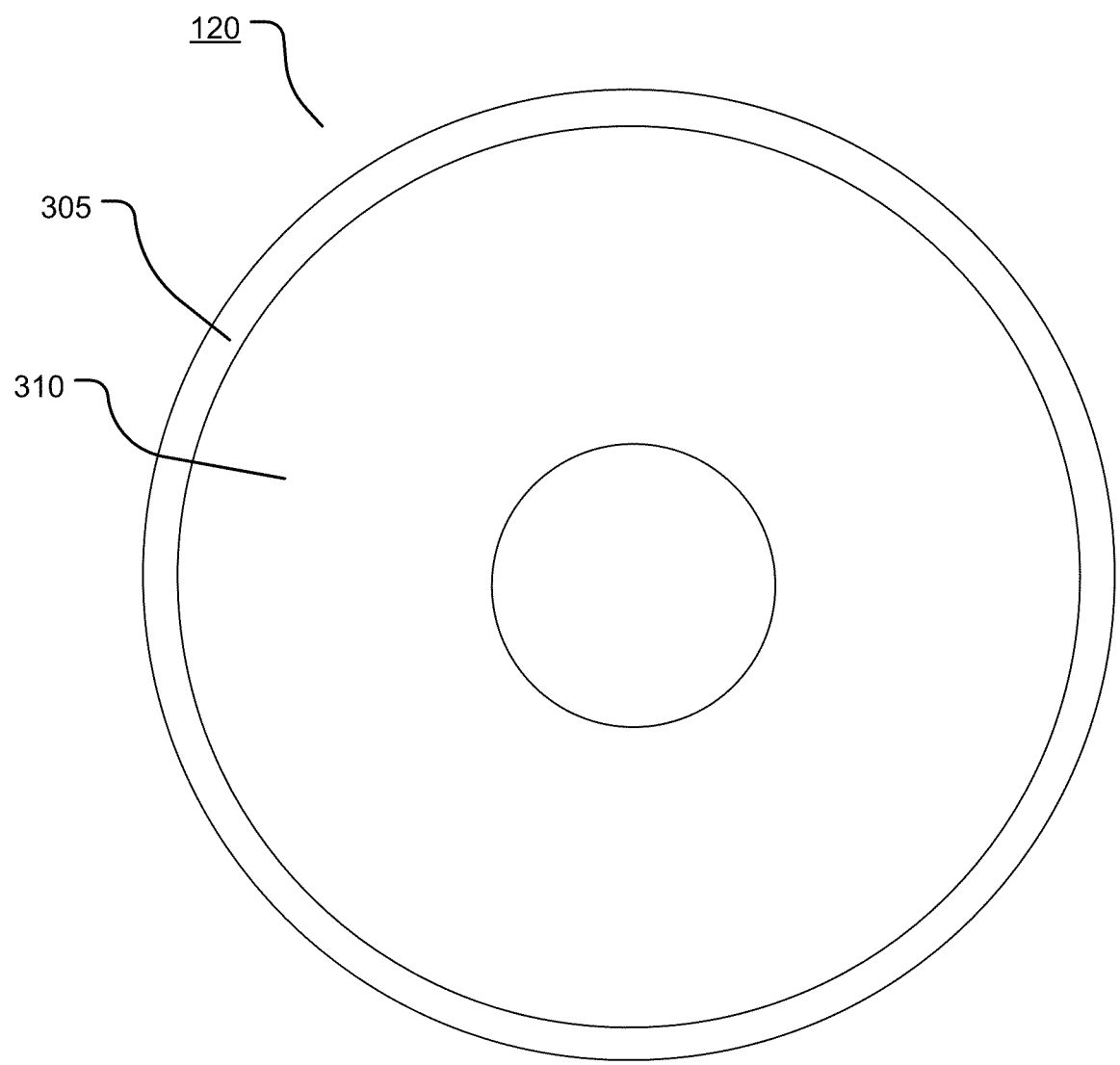
FIG. 3 is a schematic view showing an exemplary disk with a single data track.

Referring to FIG. 3, an exemplary optical disk 120 is shown. A first circumferential track 305, the outermost track of disk 120, may contain data, defined in a reflective layer of the disk 120, while the remaining area 310 of the disk 120 may contain no data. The data contained on first circumferential track 305 may be read by optics assembly 130, as shown in FIG. 1. Advantageously, first circumferential track 305 provides a greatest level of resolution. First circumferential track 305 may contain an alternating series of 0s and 1s suitable for high-resolution measurement of the relative position of disk 120. Alternatively, first circumferential track 305 may contain additional data suitable for high-resolution measuring of both the relative position and the absolute position of disk 120. For example, first circumferential track 305 may contain a binary sequence allowing encoder 100 to measure the absolute position based on the binary reading and further measure the relative position based on the specific change in bits. In an embodiment, a data track may be encoded in accordance with a pseudorandom code. The use of a suitable pseudorandom code for encoding may allow an encoder 100 with only a single data track to measure both absolute position and relative position, by utilizing a serial sequence with rapidly changing bits and with the minimum number of bits. In another embodiment, first circumferential track 305 may contain an alternating series of 0s and 1s, suitable for measurement of the relative position of 120, as well as a unique bit. In such an embodiment the absolute position may determined by measuring the relative position in reference to the unique bit.

Figure 4:
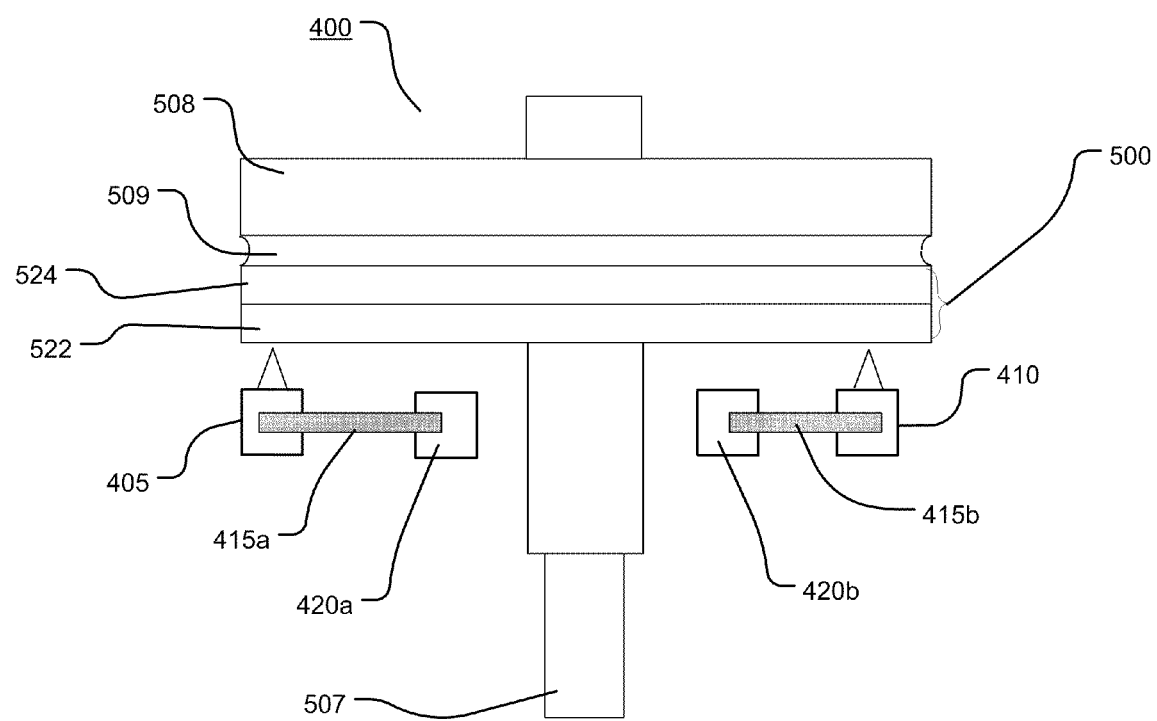
FIG. 4 is a schematic view showing a rotary position encoder having two emitter/detector assemblies.
Figure 5:
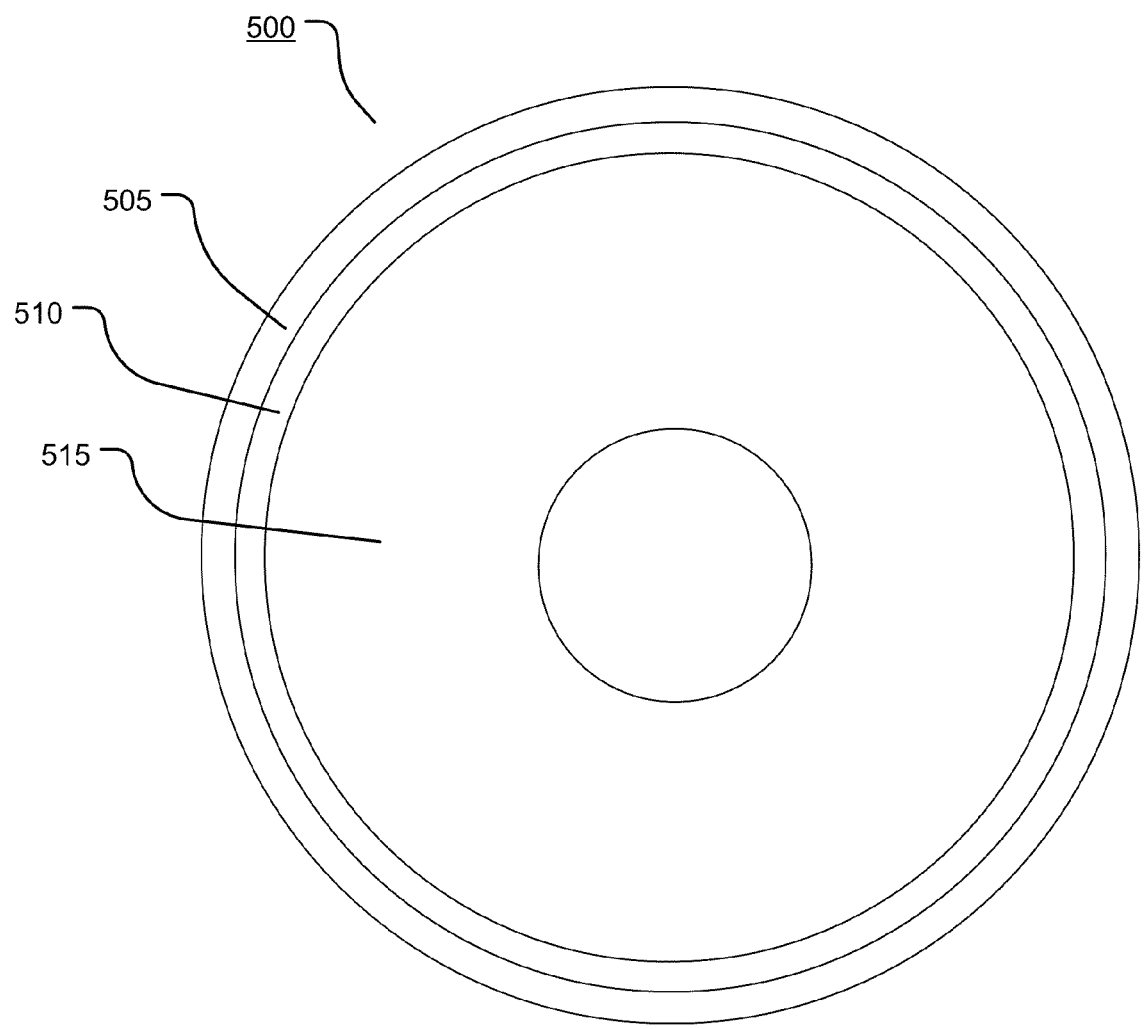
FIG. 5 is a schematic view showing an exemplary disk with multiple data tracks.

Referring to FIG. 4, an exemplary rotary position encoder 400 having two emission/detection assemblies is shown schematically. Each of the two emission/detection assemblies is provided for interrogating the optical disk 500 and providing an output signal indicative of data received from the interrogation of the optical disk 500. Optical disk 500 has a transparent layer 522 and a reflective layer 524. Optical disk 500 is rigidly mounted on rigid substrate 508 by adhesive 509. Rigid substrate 508 is in turn rigidly mounted on shaft 507. A first emission/detection assembly 405 may be positioned relative to disk 500 to enable it to interrogate a first circumferential track 505 of disk 500, as illustrated in FIG. 5. Referring again to FIG. 4, a second emission/detection assembly 410 may be positioned relative to disk 500 to enable it to interrogate a second circumferential track 510 of disk 500, as illustrated in FIG. 5 below. Referring again to FIG. 4, first emission/detection assembly 405 may be mounted to a first arm 415a which may be mounted so as to be driven by a first servo motor 420a radially relative to the optical disk 500 and second emission/detection assembly 410 may be mounted to a second arm 415b which may be mounted so as to be driven by a second servo motor 420b radially relative to the optical disk 500. Servo motor 420a and servo motor 420b may independently drive first emission/detection assembly 405 and second emission/detection assembly 410, respectively. In an embodiment, first emission/detection assembly 405 and second emission/detection assembly 410 may be mounted rigidly relative to each other on a single arm connected to a single servo motor. While FIG. 4 portrays first emission/detection assembly 405 and second emission/detection assembly 410 as being disposed on opposite sides of shaft 507, they may be disposed at in any position that allows interrogation of first circumferential track 505 and second circumferential track 510 of disk 500.

Alternative embodiments may contain more than two data tracks on an optical disk and may contain more than two emission/detection assemblies to interrogate the data tracks.

Referring to FIG. 5, an exemplary disk 500 is shown. First circumferential track 505 as well as second circumferential track 510 may contain data while the remainder 515 of the disk 500 may contain no data. First circumferential track 505 may contain an alternating series of 0s and 1s suitable for measuring of the relative position of disk 500. Second circumferential track 510 may contain data suitable for measuring of the absolute position of disk 500. For example, second circumferential track 510 may contain a serial sequence of binary numbers spanning a single complete rotation of disk 500 to allow measurement of the absolute position of disk 500. Alternatively, first circumferential track 505 may contain data suitable for measurement of an absolute position of disk 500 while second circumferential track 510 may contain an alternating series of 0s and 1s suitable for measurement of the relative position of disk 500.

In an embodiment of disk 500, first circumferential track 505 and second circumferential track 510 are contained on the two outermost tracks of disk 500 to allow for the greatest level of resolution. Second circumferential track 510 is displaced radially inward from first circumferential track 505. Alternatively, first circumferential track 505 and second circumferential track 510 may be on any of the tracks substantially close to the outer edge of disk 500 to allow for high-resolution measurements.

Figure 6:
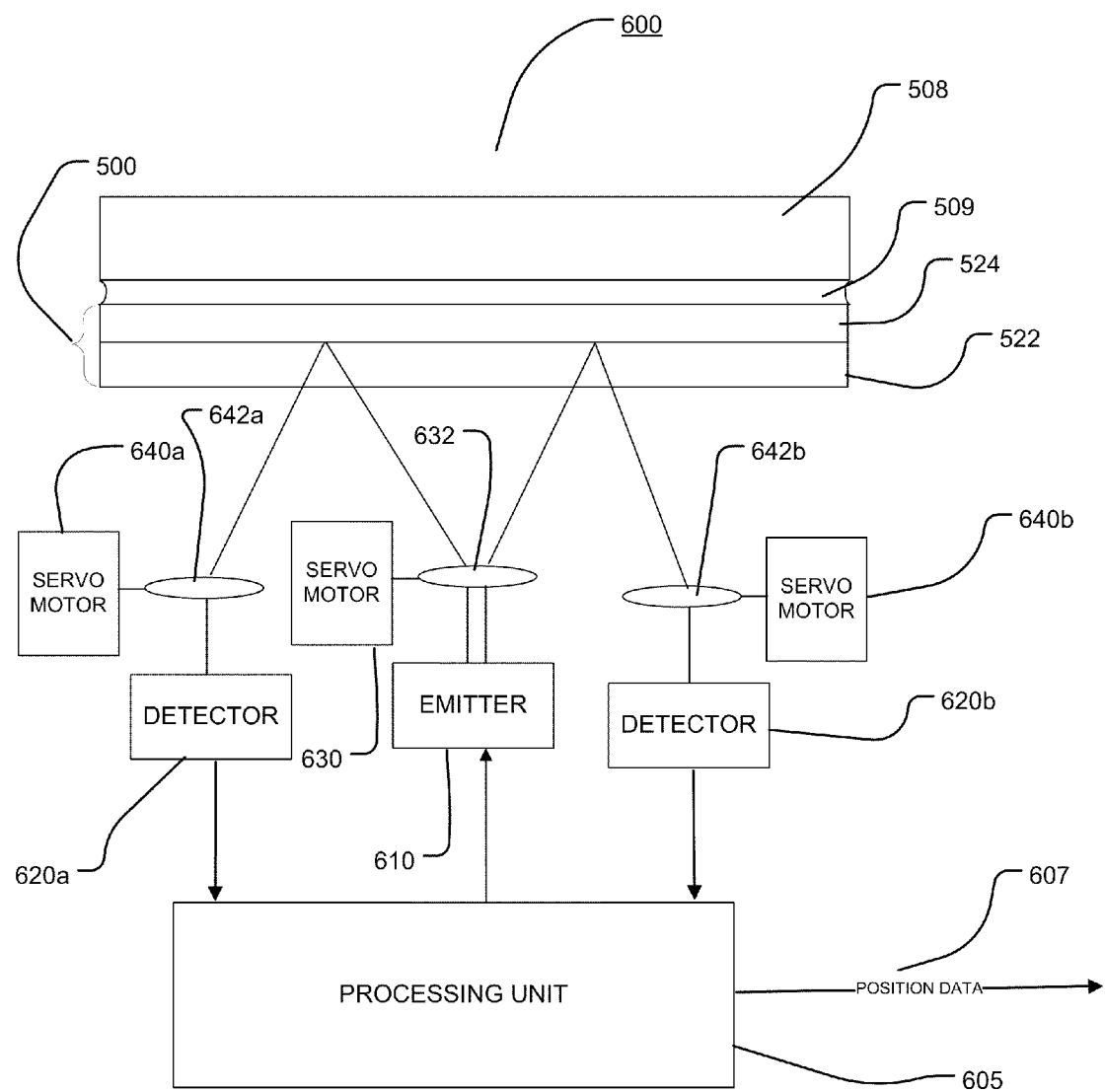
FIG. 6 is a schematic view showing a rotary position encoder having a single emitter assembly and multiple detector assemblies.

Referring now to FIG. 6, a schematic view of encoder 600 is shown. Encoder 600, similar to encoder 400, may be suitable for interrogating a disk 500 with data disposed on the first circumferential track 505 and the second circumferential track 510. Processing unit 605 may be a device including one or more suitably programmed microprocessors with a communications bus interfacing with numerous inputs and outputs. Processing unit 605 provides a control signal to optical emitter 610. In response to a control signal, optical emitter 610 emits a periodic or continuous optical beam that is focused by lens assembly 632. Lens assembly 632 may be made up of one or more lenses and may include a beam splitter. Emitter 610 and lens assembly 632 are configured such that the optical beam impinges on both the first circumferential track 505 and the second circumferential track 510 of disk 500. The positions of the lenses of lens assembly 632 may be adjusted by servo motor 630. The focused beams from lens assembly 632 transit transparent polycarbonate layer 122 of optical disk 500 and are reflected by reflective layer 524 back through polycarbonate layer 522 to a first lens assembly 642*a* and a second lens assembly 642*b*. First lens assembly 642*a*, the position of which may be adjusted by servo motor 640*a*, focuses the reflected beam onto photodetector 620*a*. Photodetector 620*a* outputs a signal having data indicative of the detected reflected beam to processing unit 605. Similarly, second lens assembly 642*b*, the position of which may be adjusted by servo motor 640*b*, focuses the reflected beam onto photodetector 620*b*. Photodetector 620*b* also outputs a signal having data indicative of the detected reflected beam to processing unit 605. Processing unit 605 may have one or more processors that execute instructions contained in code stored in memory devices, so as to interpret the data from photodetector 620*a* and photodetector 620*b* to determine a rotary position of a shaft. Processing unit 605 provides a position data output signal at 607. An alternating series of 0s and 1s may be encoded on the first circumferential track 505 of disk 500 and processing unit 605 may correspondingly interpret the data from photodetector 620*a* to determine relative rotary position of a shaft. A binary signal representing the absolute position of disk 500 may be encoded on the second circumferential track 510 of disk 500 and processing unit 605 may interpret the data from photodetector 620*b* to determine absolute rotary position of a shaft. In an embodiment, separate processing units may be provided to receive and interpret data from photodetector 620*a* and photodetector 620*b*, respectively.

Disk 120 and disk 500 may be known optical disks, such as, by non-limiting example, digital video disks (DVDs), compact disks (CDs), or disks compatible with the Blu-Ray format. Disk 120 and disk 500 may be encoded with binary sequences according to known techniques.

The first circumferential track of disks 120 and 500 and the second circumferential track of disk 500 may be circular tracks as depicted in FIGS. 3 and 5. Alternatively, according to the type of disk used, the circumferential tracks may be disposed on spiral tracks. In such an embodiment, the data may be disposed on one complete rotation of the spiral track and the optics assembly and controlling hardware, firmware, software or any combination thereof may be designed to read the single complete rotation of the spiral track as a circular track.

The operation of one or more processors within processing units in embodiments of an optical encoder may be controlled by computer readable code taking the form of software, firmware, hardware, or any combination thereof, for example code stored in read only memory. The code may include the data expected to be received from interrogation of the optical disk. The code may further include instructions for providing an optics assembly with a signal to activate the optical emitter. The optics assembly then interrogates the designated track or tracks on the optical disk, receiving a stream of bits. The processor may then execute instructions contained in the code to compare the received bits with expected data stored in the code to determine either the relative position, absolute position, or both. The code may control additional functions relating to optics assemblies and optical disks, such as controlling servo motors that move lenses so as to compensate for possible disk wobble. The optical encoder may alternatively be controlled by a processor executing instructions contained in software, or instructions stored in any other combination of hardware, firmware or software.

Figure 7:
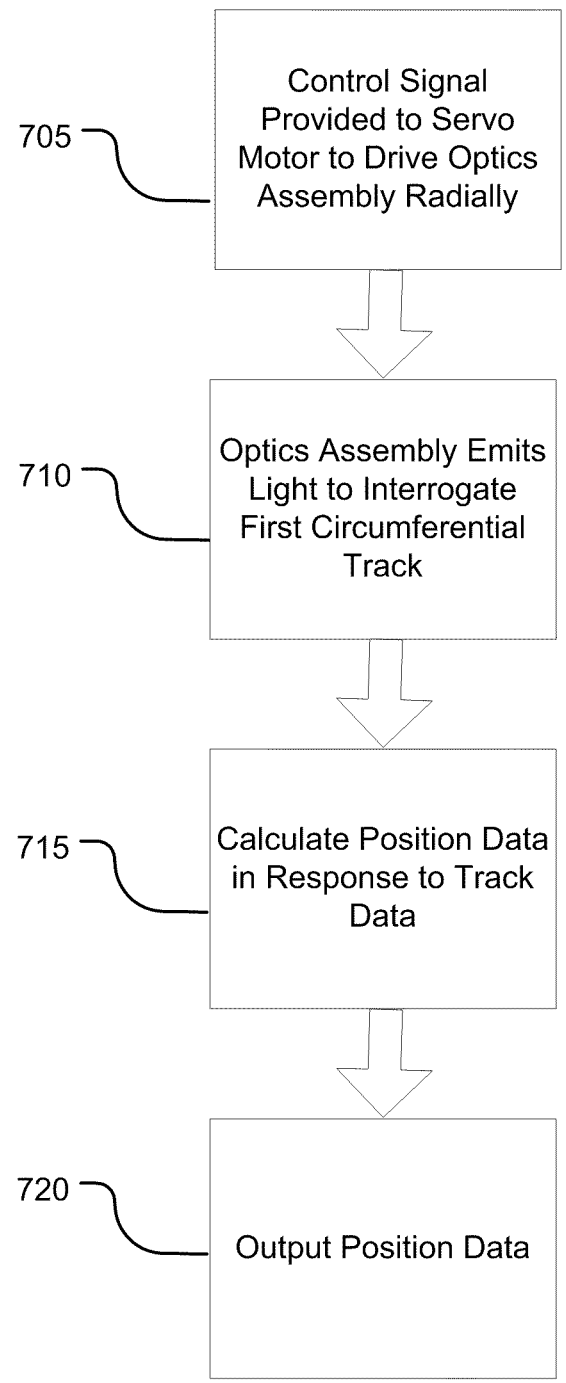
FIG. 7 is a process flow illustrating the steps performed in operation of a rotary position encoder according to an embodiment of the present invention.

Referring to FIG. 7, a process flow 700 illustrates the steps performed in operation of a rotary position encoder according to an embodiment of the present invention, such as rotary position encoder 100 of FIG. 1. As discussed above, rotary position encoder 100 may measure only the relative position by interrogating a first circumferential track on an optical disk containing an alternating series of 0s and 1s, may measure the relative position and the absolute position by interrogating a first circumferential track containing a serial code, or may measure the relative position and calculate the absolute position by interrogating a first circumferential track containing an alternating series of 0s and 1s and a reference bit. At step 705, a processing unit may provide a control signal to a servo motor for driving an optics assembly radially with respect to an optical disk, so as to align the optics assembly with a track on the optical disk. At step 710, an optics assembly interrogates a first circumferential track, and more particularly, a processing unit may provide a control signal to an optics assembly to cause the optics assembly to emit light to transit a transparent polycarbonate layer of the optical disk and to be reflected from at least one encoded track defined in a reflective layer of the optical disk. Reflected light is received by a photodetector and an output signal is provided by the photodetector to the processing unit. At step 715, the processing unit calculates position data in response to data received from interrogation of the track, such as by comparing the data received from interrogating the first circumferential track with stored expected data. The processing unit may calculate either the relative rotary position of the shaft or an absolute rotary position of the shaft. At step 720, the processing unit outputs the calculated position data. The position data may be received by a suitable device that may, by way of example, calculate, display and store, for example, speed of rotation data with respect to time.

An exemplary relative encoder according to an embodiment of the present invention may measure angular distance with about 20 bit resolution for a single rotation of the optical disk.

In the illustrated embodiments, encoded tracks are circumferential and located near an outer edge of an optical disk, as a maximum amount of position data may be encoded in this fashion. In alternative embodiments, encoded tracks may be located at any radial distance from a center of an optical disk.

Exemplary advantages of an apparatus and method in accordance with an embodiment include the following. By utilizing known technologies for disks and optics assemblies, such as CD, DVD, and Blu-Ray technologies, rotary position encoders capable of up to about 20 bit accuracy may be produced at lower cost than encoders employing etched glass or etched metal. Embodiments of the present invention may be assembled primarily with commercial off-the-shelf components, thereby providing for lower cost production than encoders employing etched glass or etched metal.

Additionally, conventional optical technologies often include several features that may not be standard in rotary position encoders, such as mechanisms to sense and compensate for wobble in the rotating disk, or servo motor controlled lenses to automatically correct if the position of the rotating disk comes slightly off track. Advantageously, embodiments of the present invention could be built to a lower tolerance than current rotary position encoders because known optical disk reader mechanisms may be inexpensively implemented to compensate if the disk is not perfectly centered or perfectly flat.

While the foregoing invention has been described with reference to the above-described embodiments, various modifications and changes can be made without departing from the spirit of the invention. Accordingly, all such modifications and changes are considered to be within the scope of the appended claims.

What is claimed is:

1. A rotary position encoder for determining an angular position of a shaft, comprising:
   an optical disk having at least a transparent polycarbonate layer and a reflective layer on the transparent polycarbonate layer, affixed to the shaft, the optical disk having a first circumferential track encoded therein having binary data and a second circumferential track encoded therein having binary data displaced radially from the first circumferential track;
   an optics assembly for interrogating the first and second circumferential tracks of the optical disk and outputting an output signal indicative of data received from the interrogation of the first and second circumferential tracks of the optical disk; and
   a processing unit for receiving the output signal from the optics assembly, correlating the output signal with a predetermined characteristic of the shaft, and outputting a signal indicative of the angular position of the shaft based on the correlation.

2. The rotary position encoder of claim 1, wherein the optics assembly comprises a first emitter for emitting light to the optical disk, a first lens associated with the first emitter for focusing light emitted by the first emitter, a first servo motor for adjusting the position of the first lens relative to the first emitter, a first photodetector for receiving light reflected from the optical disk and providing an output signal indicative of properties of the reflected light; a second emitter for emitting light to the optical disk, a second lens associated with the second emitter for focusing light emitted by the second emitter, and a second servo motor for adjusting the position of the second lens relative to the second emitter.

3. The rotary position encoder of claim 1, further comprising a rigid substrate mounted to the shaft, and wherein the optical disk is affixed to a planar surface of the substrate.

4. The rotary position encoder of claim 1, wherein the first circumferential track comprises relative position data and the second circumferential track comprises absolute position data.

5. The rotary position encoder of claim 4, wherein the optics assembly comprises a first optics assembly and a second optics assembly, the first optics assembly comprising a first emitter and the second optics assembly comprising a second emitter for interrogating respective first and second circumferential tracks of the optical disk and providing an output signal indicative of data received from the interrogation of the first and second circumferential tracks of the optical disk.

6. The rotary position encoder of claim 5, further comprising a second tracking motor for driving the second optics assembly radially with respect to the optical disk.

7. The rotary position encoder of claim 1, wherein the optical disk is a digital video disk.

8. The rotary position encoder of claim 1, wherein the optical disk is a disk compliant with the Blu-Ray format.

9. The rotary position encoder of claim 1, wherein the optics assembly comprises an emitter and lens assembly configured such that the beam emitted by the emitter impinges on the first and second circumferential tracks simultaneously.

10. The rotary position encoder of claim 9, wherein the optics assembly comprises a beam splitter for impinging the first and second circumferential tracks with the beam emitted by the emitter.

11. The rotary position encoder of claim 10, wherein the optics assembly further comprises a first detector and a second detector for receiving reflected beams from the first and second circumferential tracks, respectively.

12. The rotary position encoder of claim 11, wherein the optics assembly further comprises a first lens associated with the emitter, and second and third lenses associated with a respective one of the first and second detectors.

13. The rotary position encoder of claim 12, wherein the optics assembly further comprises first, second and third servo motors associated with a respective one of the first, second and third lenses.

14. The rotary position encoder of claim 1, further comprising a tracking motor for driving the optics assembly radially with respect to the optical disk.

15. The rotary position encoder of claim 1, wherein the first encoded circumferential track is concentric with respect to the rotational axis of the shaft.

16. The rotary position encoder of claim 15, wherein the first encoded circumferential track comprises a circular track.

17. The rotary position encoder of claim 1, wherein the processor is operative to correlate the output signal with stored data associated with an angular position.

18. A method of determining an angular position of a shaft, comprising:
   driving an optics assembly radially with respect to an optical disk affixed to a rigid substrate affixed to the shaft;
   emitting light by the optics assembly to transit a transparent polycarbonate layer of the optical disk and to be reflected from a first encoded track and a second encoded track defined in a reflective layer of the optical disk;
   receiving light reflected from the first encoded track and the second encoded track;
   outputting a signal indicative of the received light from the first encoded track and the second encoded track;
   determining the angular position of the shaft based on the signal by correlating the signal with a predetermined characteristic of the shaft; and
   outputting a signal indicative of the angular position of the shaft based on the correlation.

19. The method of claim 18, wherein the first encoded track is encoded with data comprising an alternating series of binary 0s and 1s for determining the relative position of the shaft.

20. The method of claim 19, wherein the second encoded track is encoded with data comprising an alternating series of binary 0s and 1s and at least one unique bit for determining the absolute position of the shaft.

21. A rotary position encoder for determining one or more of the angular position and rotary speed of a shaft, comprising:
- a rigid substrate having a planar surface, said substrate mounted to said shaft and configured to rotate with said shaft;
- an optical disk affixed to the planar surface of the substrate, said optical disk having a first circumferential track encoded therein having binary data and a second circumferential track encoded therein having binary data;
- an optics assembly configured to interrogate the first circumferential track and the second circumferential track of the optical disk and output a data stream containing the results of the interrogation of the first circumferential track and the second circumferential track;
- a tracking motor configured to drive the optics assembly radially with respect to the optical disk; and
- a processor operatively coupled to said optics assembly and configured to control said optics assembly, process said data stream, correlate said data stream with a predetermined characteristic of the shaft, and output a signal including one or more of the angular position and rotary speed of the shaft based on said correlation,
- wherein the optical disk comprises a transparent layer and a reflective layer on the transparent layer.

22. The rotary position encoder of claim 21, wherein the optics assembly comprises:
- an emitter configured to emit light through a focusing lens; and
- a beam splitter configured to allow light emitted from said emitter to pass through said focusing lens in a first direction and configured to allow light reflected from said optical disk to be refracted or reflected into a detector.

* * * * *